(12) United States Patent
Chan et al.

(10) Patent No.: US 11,321,300 B2
(45) Date of Patent: May 3, 2022

(54) METHOD AND SYSTEM FOR FAST PROCESSING OF LOCKS REQUESTED TO ACCESS A SHARED RESOURCE

(71) Applicant: HUAWEI TECHNOLOGIES CO., LTD., Guangdong (CN)

(72) Inventors: Yuk Kuen Chan, Markham (CA); Huaxin Zhang, Markham (CA); Wenbin Ma, Sammamish, WA (US); Hoi Ieng Lao, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 269 days.

(21) Appl. No.: 16/596,144

(22) Filed: Oct. 8, 2019

(65) Prior Publication Data
US 2021/0103576 A1 Apr. 8, 2021

(51) Int. Cl.
*G06F 16/23* (2019.01)
*G06F 16/27* (2019.01)

(52) U.S. Cl.
CPC ...... *G06F 16/2343* (2019.01); *G06F 16/2358* (2019.01); *G06F 16/2365* (2019.01); *G06F 16/27* (2019.01)

(58) Field of Classification Search
CPC .......... G06F 16/2343; G06F 16/27; G06F 16/2365; G06F 16/2358
USPC ...................................................... 707/781
See application file for complete search history.

(56) References Cited

U.S. PATENT DOCUMENTS

| | | | |
|---|---|---|---|
| 10,535,368 B1* | 1/2020 | Dice | G11B 20/10268 |
| 2004/0225742 A1* | 11/2004 | Loaiza | G06F 9/526 709/229 |
| 2006/0212573 A1* | 9/2006 | Loaiza | G06F 9/526 709/225 |
| 2010/0114849 A1 | 5/2010 | Kingsbury et al. | |
| 2012/0089735 A1* | 4/2012 | Attaluri | G06F 9/5038 709/226 |

FOREIGN PATENT DOCUMENTS

| | | |
|---|---|---|
| CN | 1945539 A | 4/2007 |
| CN | 103064898 A | 4/2013 |
| CN | 104461707 A | 3/2015 |
| CN | 105426469 A | 3/2016 |
| CN | 109063132 A | 12/2018 |

OTHER PUBLICATIONS

International Search Report and Written Opinion of PCT/CN2020/114948; Jian Wang; dated Dec. 10, 2020.

\* cited by examiner

*Primary Examiner* — Michael Pham
(74) *Attorney, Agent, or Firm* — BCF LLP (57) ABSTRACT

The disclosed systems, structures, and methods are directed towards for processing a lock request by a master node to access a shared data object in a database located at a remote location comprising identifying, in the master node, a category of the lock request. If the lock request is for a self-compatible lock, determining a value of a counter associated with the master node and with one or more other master nodes, and if the value of the counter is zero, locally granting the lock request. If the value of the counter is greater than zero, forwarding the lock request to a global lock manager (GLM), and if the lock request is for a heavy-conflicting lock, forwarding the lock request by the master node to the GLM.

19 Claims, 9 Drawing Sheets

802 → storing a lock request in a global hash table associated with the GLM

804 → identifying, in the GLM, a category of the lock request as a self-compatible lock request or a heavy-conflicting lock request 806 → if the global hash table contains one or more self-compatible lock requests and at least one heavy-conflicting lock request, granting by the GLM the one or more self-compatible lock requests prior to granting the heavy-conflicting lock request 808 → if the GLM receives at least one self-compatible lock request after the at least one heavy-conflicting lock request and the at least one heavy-conflicting lock request is yet to be granted, granting by the GLM the at least one self-compatible lock request prior to granting the at least one heavy-conflicting lock request

FIG. 9

METHOD AND SYSTEM FOR FAST PROCESSING OF LOCKS REQUESTED TO ACCESS A SHARED RESOURCE

CROSS-REFERENCE TO RELATED APPLICATIONS

This is the first application filed for the instantly disclosed technology.

TECHNICAL FIELD

The present disclosure generally relates to the field of databases, in particular, to method and system for processing a lock request sent by a master node to access a shared data object in a database stored at a remote location.

BACKGROUND

With increasing advancements in computer technology (e.g., speed of processors, software functionality, transfer bandwidth, memory capacity, and the like), computer systems have become a vital part in almost all segments of technology. Such computer systems have generally contributed to increased computer applications handling a huge amount of data. Various server systems have been associated with such computer systems to store data in a database and service requests originating from user applications running on such computer systems. As such, the computer systems and server systems rely on a database management system (DBMS) for managing data stored in the database.

A database is a data structure that stores an organized collection of information, including related information. A database includes "records" having "fields" of information therein. As an example, a database associated with finances may have a record for financial transactions such as amount owed, customer information, accounts receivables, and the like. Between the database and the user applications running on client devices that access the database, the DBMS is typically provided as software intermediate. Generally, all requests to access data stored in the database are received from user applications running on client devices and are processed by the DBMS. Information can be added or removed from records, information retrieved from or updated in such records, and the like, all without user knowledge of concurrent access to the database is implemented.

While interacting with such computer systems, many databases employ a function referred to as locking to ensure that data stored in the database is not concurrently modified by another user application. Typically, such locking can prevent another user application from changing the same data at the same time. If locking does not operate properly, data stored in the database can become logically incorrect, and future use of this data can produce undesired results. In addition, multiple transactions trying to use the same data concurrently can give rise to several different types of problems referred to as concurrency problems.

Such problems can cause updates of data in the database by one application to be lost or overwritten by updates of the data in the database by another application. Sometimes data is modified in the database, but not immediately persisted to storage (e.g., a disk) or committed by the DBMS so that it can be read by other user applications. This can also result in inconsistent values of the data being read by distinct user applications. Further problems can result from user applications accessing copies of data that are later changed by other user applications. There are several different types of locks, such as exclusive locks, shared locks, update locks and other types of locks. Many types of locks provide some amount of concurrency to ensure that two user applications do not modify the data of the same record at the same time. Such types of locks can consume system resources and have associated costs.

Consequently, there is a need for fast, efficient and economical locking for databases.

SUMMARY

An object of the present disclosure is to provide a method for processing a lock request by a master node to access a shared data object in a database stored at a remote location, the method comprising identifying, in the master node, a category of the lock request, if the lock request is for a self-compatible lock, determining a value of a counter associated with the master node and with one or more other master nodes, and if the value of the counter is zero, locally granting the lock request, if the value of the counter is greater than zero, forwarding the lock request to a global lock manager (GLM), and if the lock request is for a heavy-conflicting lock, forwarding the lock request by the master node to the GLM.

In accordance with other aspects of the present disclosure, the method, wherein locally granting the lock request by the master node is performed without communicating with the GLM.

In accordance with other aspects of the present disclosure, the method, further comprising retrieving, by the master node, information associated with the heavy-conflicting lock request from the GLM, and incrementing, by the master node, the counter associated with the master node and with the one or more other master nodes.

In accordance with other aspects of the present disclosure, the method, wherein the information associated with the heavy-conflicting lock request comprises an epoch number, a heavy-conflicting lock identity, and lock acquisition information.

In accordance with other aspects of the present disclosure, the method, wherein the master node acknowledges the GLM by updating the epoch number in an acknowledgement array.

In accordance with other aspects of the present disclosure, the method, further comprising releasing the new self-compatible lock request following a release of the active heavy-conflicting lock by the master node or by one of the other master nodes.

In accordance with other aspects of the present disclosure, the method, further comprising holding a lock by the master node, the master node continuing to hold the lock for at least one subsequent lock request for the same lock within the master node.

In accordance with other aspects of the present disclosure, the method, wherein the at least one subsequent lock request is a subsequent self-compatible lock or a subsequent heavy-conflicting lock.

In accordance with other aspects of the present disclosure, the method, further comprising granting the at least one subsequent lock request locally without communicating with the GLM.

In accordance with other aspects of the present disclosure, the method, further comprising storing the at least one subsequent lock request within a local shared memory of the master node.

In accordance with other aspects of the present disclosure, the method, wherein the local shared memory of the master node further comprises an associated counter counting the number of subsequent lock requests being stored and granted locally within the local shared memory of the master node.

In accordance with other aspects of the present disclosure, the method, further comprising applying a limit on a maximum number of subsequent lock requests being stored and granted locally within the local shared memory of the master node.

In accordance with other aspects of the present disclosure, there is provided a master node for processing a lock request for accessing a resource located at a remote location and shared by the master node and by one of more other master nodes, the master node comprising a processor, a non-transitory computer-readable medium comprising instructions that, when executed, cause the processor to identify, in the master node, a category of the lock request, if the lock request is for a self-compatible lock determine a value of a counter associated with the master node and with the one of more other master nodes, and if the value of the counter is zero, locally grant the lock request, if the value of the counter is greater than zero, forward the lock request by the master node to a global lock manager (GLM), and if the lock request is for a heavy-conflicting lock, forward the lock request by the master node to the GLM.

In accordance with other aspects of the present disclosure, there is provided a method for processing a lock request by a global lock manager (GLM), wherein the lock is requested by a plurality of master nodes to access a shared resource, the method comprising storing a lock request in a global hash table associated with the GLM, identifying, in the GLM, a category of the lock request as a self-compatible lock request or a heavy-conflicting lock request, if the global hash table contains one or more self-compatible lock requests and at least one heavy-conflicting lock request, granting by the GLM the one or more self-compatible lock requests prior to granting the heavy-conflicting lock request, and if the GLM receives at least one self-compatible lock request after the at least one heavy-conflicting lock request and the at least one heavy-conflicting lock request is yet to be granted, granting by the GLM the at least one self-compatible lock request prior to granting the at least one heavy-conflicting lock request.

In accordance with other aspects of the present disclosure, the method, further comprising placing a new self-compatible lock request on hold in the global hash table by the GLM, if there is an active heavy-conflicting lock in one of the plurality of the master nodes and releasing the new self-compatible lock request following a release of the active heavy-conflicting lock by one of the plurality of the master nodes.

In accordance with other aspects of the present disclosure, the method, further comprising granting, by the GLM, a plurality of new self-compatible lock requests held in the global hash table following the release of the active heavy-conflicting lock by one of the plurality of the master nodes.

In accordance with other aspects of the present disclosure, the method, wherein the GLM places information associated with the release of the active heavy-conflicting lock on a data structure to be pulled by the plurality of master nodes.

In accordance with other aspects of the present disclosure, there is provided a global lock manager (GLM) for processing a lock request requested by a plurality of master nodes for accessing a resource, the GLM comprising a processor, a non-transitory computer-readable medium comprising instructions that, when executed, cause the processor to store a lock request in a global hash table associated with the GLM, identify, in the GLM, a category of the lock request as a self-compatible lock request or a heavy-conflicting lock request, if the global hash table contains one or more self-compatible lock requests and at least one heavy-conflicting lock request, grant by the GLM the one or more self-compatible lock requests prior to granting the heavy-conflicting lock request and if the GLM receives at least one self-compatible lock request after the at least one heavy-conflicting lock request and the at least one heavy-conflicting lock request is yet to be granted, grant by the GLM the at least one self-compatible lock request prior to granting the at least one heavy-conflicting lock request.

BRIEF DESCRIPTION OF THE FIGURES

The features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain to.

Figure 1:
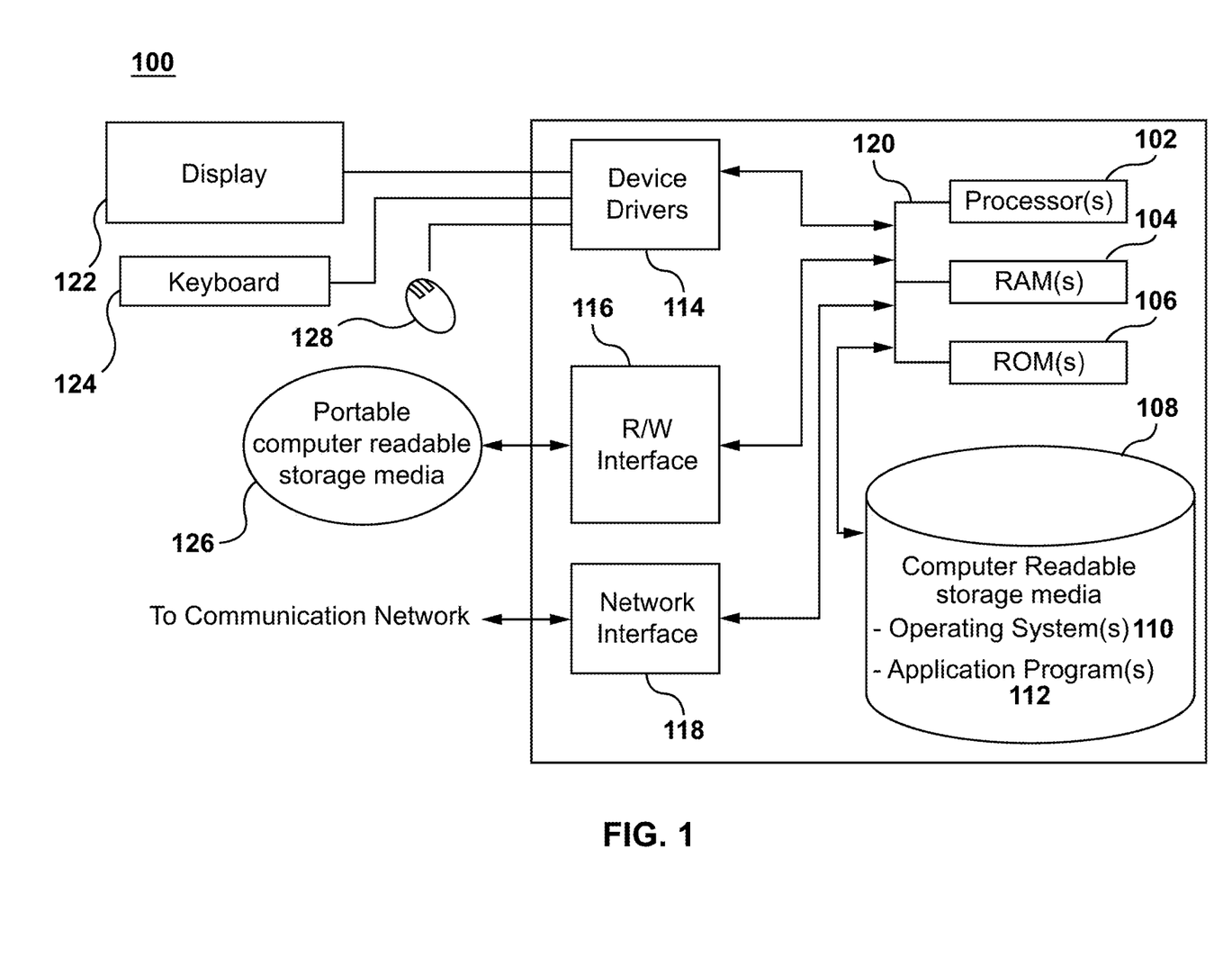
FIG. 1 depicts a high-level block diagram of components of a master node, in accordance with various embodiments of the present disclosure.

FIG. 1 depicts a high-level block diagram of components of a master node 100, in accordance with various embodiments of the present disclosure. It should be appreciated that FIG. 1 provides only an illustration of one implementation of the master node 100 and does not imply any limitations with regard to the environments in which different embodiments may be implemented. Many modifications to the depicted environment can be done to implement the master node 100 without departing from the principles presented herein. The master node 100 may be a server, a desktop computer, a laptop computer, a tablet, a smart-phone, a personal digital assistant or any device that may be configured to implement the present technology, as should be understood by a person skilled in the art.

As shown, the master node 100 employs one or more processors 102, one or more computer-readable random access memories (RAMs) 104, one or more computer-readable read only memories (ROMs) 106, one or more computer-readable storage media 108, device drivers 114, a read/write (R/W) interface 116, a network interface 118, all interconnected over a communication fabric 120. The communication fabric 120 may be implemented with any architecture designed for passing data and/or control information between processors (such as microprocessors, communications and network processors, etc.), system memory, peripheral devices, and any other hardware components within a system.

One or more operating systems 110 and one or more application programs 112 are stored on one or more of the computer-readable storage media 108 for execution by the one or more of the processors 102 via the one or more of the respective RAMs 104 (which typically include a cache memory). In the illustrated embodiment, each of the computer-readable storage media 108 maybe a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W drive or interface 116 reads from and writes to one or more portable computer-readable storage media 126. Application programs 112 may be stored on one or more of the portable computer-readable storage media 126, read via the respective R/W drive or interface 116 and loaded into the respective computer-readable storage media 108.

Further, the network interface 118 may be based on a TCP/IP adapter card or wireless communication adapter (such as a 4G wireless communication adapter using OFDMA technology). The application programs 112 on the master node 100 may be downloaded to the master node 100 from an external computer or external storage device via a communication network (for example, the Internet, a local area network or other wide area network or wireless network) and network interface 118. From the network interface 118, the application programs 112 may be loaded onto computer-readable storage media 108. The master node 100 may connect to routers, firewalls, switches, gateway computers and/or edge servers of the communication network using copper wires, optical fibers, wireless transmission, and the like.

The master node 100 may also include a display screen 122, a keyboard or keypad 124, and a computer mouse or touchpad 128. The device drivers 114 may interface with the display screen 122 for imaging, with the keyboard or keypad 124, with the computer mouse or touchpad 128, and/or with the display screen 122 (which may be a touch sensitive display) for alphanumeric character entry and user selections. The device drivers 114, R/W interface 116 and network interface 118 may comprise hardware and software (stored on computer-readable storage media 108 and/or ROM 106).

Figure 2:
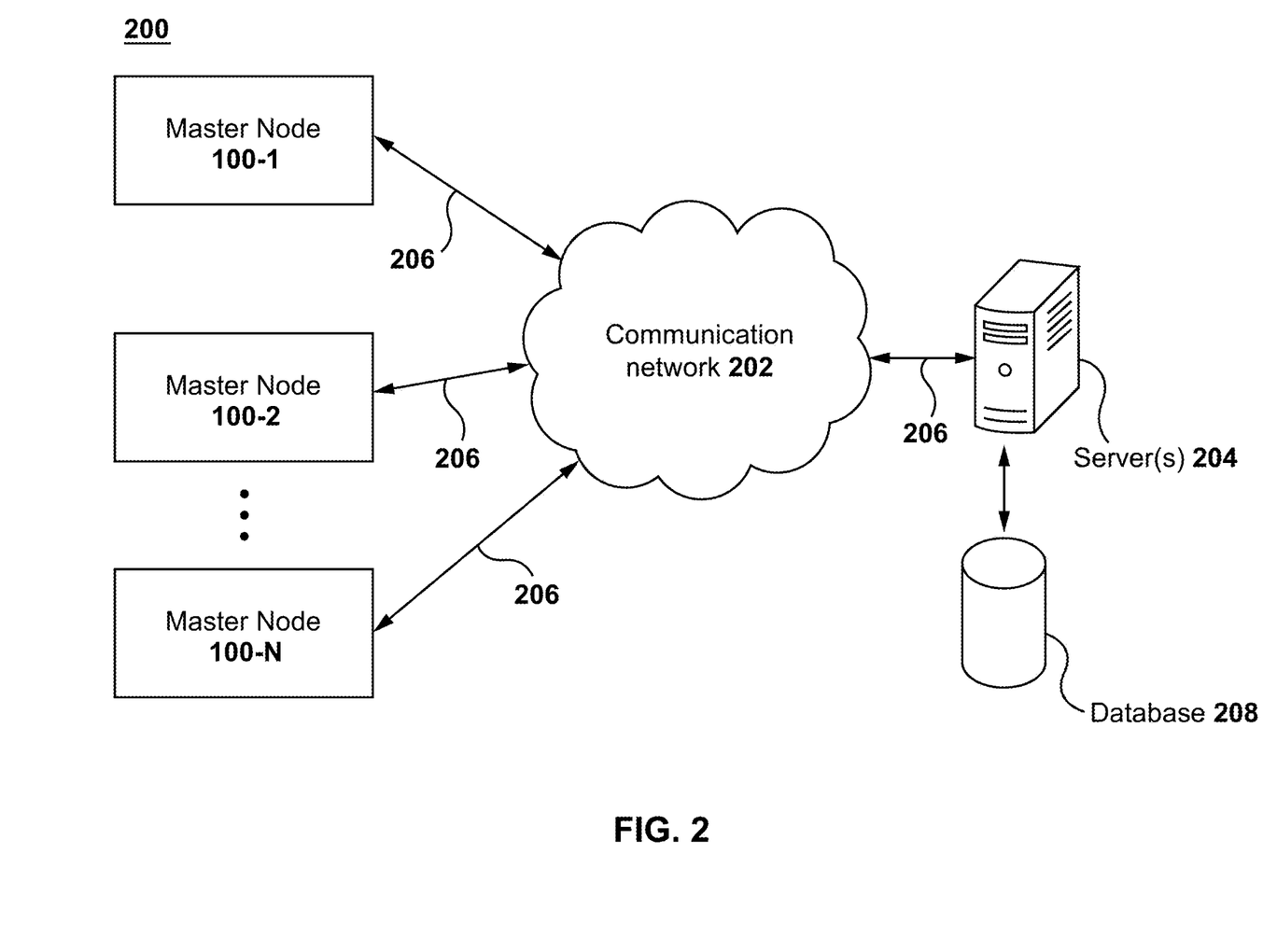
FIG. 2 depicts a system being implemented in accordance with various embodiments of the present disclosure.

FIG. 2 depicts a system 200 implemented in accordance with various embodiments of the present disclosure. As shown, the system 200 comprises N master nodes 100-1, 100-2 . . . 100-N. Each of the N master nodes 100-1, 100-2 . . . 100-N include the same components as the master node 100. Further, each of the N master nodes 100-1, 100-2 . . . 100-N is coupled to a communication network 202 via a respective communication link 206. The communication network 202 may be implemented using any suitable technologies such as the internet, wide-area communications network, local-area communications networks, private communications network, etc.

How the communication link 206 is implemented is not particularly limited and will depend on how the N master nodes 100-1, 100-2 . . . 100-N are implemented. Merely as an example and not as a limitation, in those embodiments of the present disclosure where at least one of the N master nodes 100-1, 100-2 . . . 100-N includes a network interface 118 based on a wireless communication adapter, the communication link 206 can be implemented as a wireless communication link (such as but not limited to, a 3G communications network link, a 4G communications network link, a Wireless Fidelity, or WiFi® for short, Bluetooth® and the like). In those examples, where at least one of the N master nodes 100-1, 100-2 . . . 100-N includes a network interface 118 a TCP/IP adapter card, the communication link 206 can be either wireless (such as WiFi®, Bluetooth® or the like) or wired (such as an Ethernet based connection).

Implementations for the plurality N master nodes 100-1, 100-2 . . . 100-N, the communication network 202, and the communications link 206 are provided for illustration purposes only. As such, those skilled in the art will easily appreciate other specific implementation details for the N master nodes 100-1, 100-2 . . . 100-N, the communication network 202, and the communications link 206. As such, examples provided herein above are meant to limit the scope of the present technology.

Further, the communications network 202 is also coupled to one or more servers 204. The one or more servers 204 can be implemented as conventional computer servers. In certain embodiments of the present disclosure, the one or more servers 204 can be implemented as a Dell™ PowerEdge™ Server running Microsoft™ Windows Server™ operating system. The one or more servers 204 may further operatively coupled to a database 208. By way of example, the database 208 may contain a tangible computer-readable storage medium including Read-Only Memory (ROM) and/or Random-Access Memory (RAM), one or more fixed storage devices in the form of, by way of example, hard disk drives (HDDs), solid-state drives (SSDs), and flash-memory cards. The database 208 stores shared data objects and the shared data objects may include a file in a file system, a record in a database, a block of data, a page, or the like. The N master nodes 100-1, 100-2 . . . 100-N may have access to a shared data object in the database 208. The N master nodes 100-1, 100-2 . . . 100-N each store a copy of the database 208. The master nodes 100-1, 100-2 . . . 100-N, the communications network 202, and the server 204 together form a distributed database system.

Needless to say, the one or more servers 204 can be implemented in any other suitable hardware and/or software and/or firmware or a combination thereof. In certain embodiments, the database 208 may be implemented within one or more servers 204. Furthermore, the one or more servers 204 can be implemented in different hardware or software therebetween.

Figure 3:
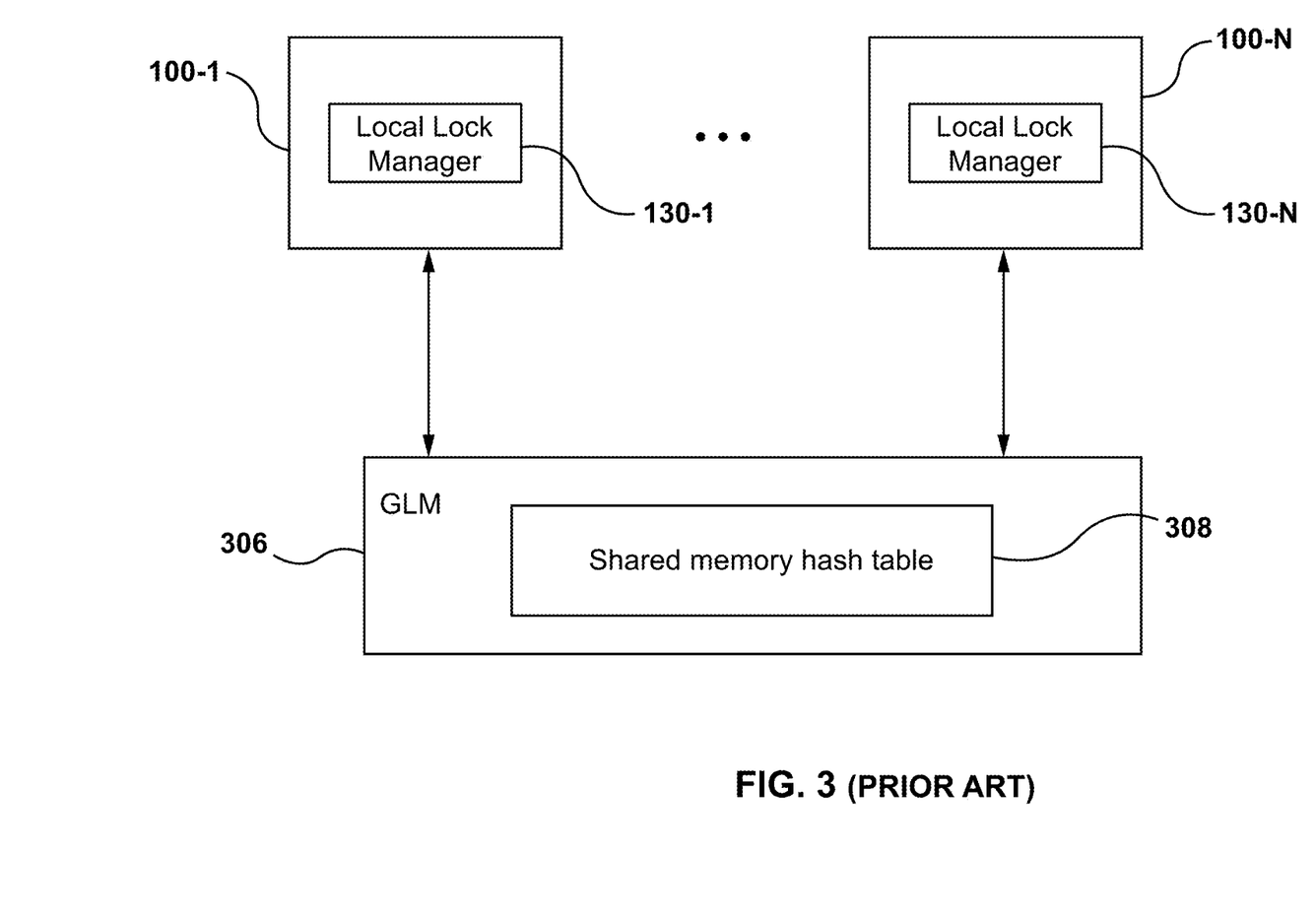
FIG. 3 (prior art) depicts a conventional means to implement a global lock manager (GLM) and local lock managers associated with N master nodes.

FIG. 3 (prior art) depicts a conventional means to implement a global lock manager (GLM) 306 and local lock managers 130-1 . . . 130-N associated with the N master nodes 100-1, 100-2 . . . 100-N. As shown, conventional local lock managers 130-1 . . . 130-N have been implemented in the N master nodes 100-1, 100-2 ... 100-N. The GLM 306 is implemented on one or more of the servers 204 (FIG. 2) located at a distant location from the N master nodes 100-1, 100-2 ... 100-N. It will be appreciated that the conventional local lock managers 130-1 ... 130-N may be implemented as software comprising programming instructions stored in computer-readable storage media 108, loaded into ROM 108, and executable by processor(s) of the master nodes 100-1, 100-2 ... 100-N. The GLM 306 may be implemented as a software module of the DBMS (not shown) that includes programming instructions which are stored in memories (not shown) of the server(s) 204 and executable by the processor(s) (not shown) of the server(s) 204.

The conventional local lock managers 130-1 ... 130-N analyze and manage the lock requests of different threads (or processes) running on the master nodes 100-1, ..., 100-N by utilizing a shared memory space. The conventional local lock managers 130-1 ... 130-N and the requesting threads (or processes) co-exist within the same master node (e.g. master node 100-1).

Typically, the N master nodes 100-1, 100-2 ... 100-N request the GLM 306 for a lock to a shared data object (e.g. page, table or a row in the database) in the database 208 and all such requests are usually stored in a shared memory hash table 308. Generally, locking of a shared data object (e.g. page, table or a row in the database) via any one of the master nodes 100-1, 100-2 ... 100-N means that during a transaction, the locked shared data object (e.g. page, table or a row in the database) may not be available for use by other master nodes 100-1, 100-2 ... 100-N, making them wait for execution until the shared data object is unlocked.

When the request is received by the GLM 306, the request may be processed and if the request is not conflicting with previous requests relating the resource, which are currently being executed, the GLM 306 may send back to the requesting master node (e.g. master node 100-1), a message granting the lock request. If the grant cannot be issued, the GLM 306 cannot send a grant message and the process on the master node (e.g. master node 100-1) may have to wait for the grant. This would be a case if the request resource is already locked by some other master node (e.g. master node 100-2)

If the lock status of the particular resource changes from locked to unlock (i.e. lock released), the GLM 306 may reprocess the request and send a grant. If the lock status does not change to allow a grant, the grant is not sent and the master node (e.g. master node 100-1) may abort the operation. Examples of types of locks that may be requested are: read locks, write locks and exclusive locks.

Once a lock is granted to the master node (e.g. master node 100-1), the conventional local lock manager (e.g. conventional local lock manager 130-1) may synchronize the lock among the processes or threads running on the master node that requested the lock. For example, on the master node 100-1, a thread that is performing an update operation on a particular row of a particular table may have requested the lock. Further, the grant of the particular lock is maintained as a data structure within the conventional local lock manager (e.g. conventional local lock manager 130-1) showing the details of the resource, the type of the lock and the details of the process that received the grant. The GLM 306 maintains. a data structure showing the details of the resource, the type of the lock and the master node ID (e.g. master node 100-1) that received the grant and the details of the process that received the grant.

When threads running on a master node release the lock of the resource, they notify the conventional local lock manager (e.g. conventional local lock manager 130-1) that a lock was released and if the lock is released by all threads running on the master node (e.g. master node 100-1), the GLM 306 is notified that the lock over the shared data object within a particular master node was released.

Since the conventional local lock manager (e.g. conventional local lock manager 130-1) and the threads of a particular master node share the same memory space, lock requests to the conventional local lock manager (e.g. conventional local lock manager 130-1) are processed rapidly. However, as the conventional local lock manager (e.g. conventional local lock manager 130-1) and the GLM 306 don't share the same memory space, lock requests that are sent by the conventional local lock manager to the GLM 306 are based on messages that utilize the communication network 202 and may be much slower.

Based on experiments and observation on various types of existing locking mechanisms for locking concurrent access to data in the database, the locks can be classified into two categories: self-compatible locks, which are frequent and lightweight and heavy-conflicting locks, which are infrequent. For example, READ accesses usually require locks that are lightweight because they are in shared-mode, while UPDATE/INSERT/DELETE accesses usually require locks that are heavy-conflicting because they are in exclusive-mode. Hence, self-compatible locks are compatible with concurrent lock holders of the same resource (e.g. page, table or a row in the database) under the same lock mode while heavily-conflicting locks are not compatible with other concurrent lock holders on the same resource (e.g. page, table or a row in the database). Detailed examples are provided hereinbelow.

One such example is PostgreSQL™ database. Table 1 illustrates that PostgreSQL™ database has eight lock modes. The top three lock modes are compatible between each other, and can be classified as "self-compatible" lock modes using the above categorization. The bottom five lock modes are not compatible with each other, not even compatible with the "self-compatible" lock modes, thus they are the "heavy-conflicting" lock modes.

TABLE 1

| Requested Lock Mode | Current Lock Mode | | | | | | |
|---|---|---|---|---|---|---|---|
| | Access Share | Row Share | Row Exclusive | Share Update Exclusive | Share | Share Row Exclusive | Exclusive |
| Access Share | | | | | | | |
| Row Share | | | | | | | X |
| Row Exclusive | | | | X | | X | X |

TABLE 1-continued

| Requested Lock Mode | Current Lock Mode | | | | | | |
|---|---|---|---|---|---|---|---|
| | Access Share | Row Share | Row Exclusive | Share Update Exclusive | Share | Share Row Exclusive | Exclusive |
| Share Update Exclusive | | | | X | X | X | X |
| Share | | | X | X | | X | X |
| Share Row Exclusive | | | X | X | X | X | X |
| Exclusive | | X | X | X | X | X | X |
| Access Exclusive | X | X | X | X | X | X | X |

Also based on experiments and observations, during typical database workloads, most of the locks requested are the self-compatible locks. The heavy-conflicting lock requests account for less than 0.2% of all lock requests during database setup phase, and account for less than 0.1% during normal day-to-day database workload runs.

Figure 4:
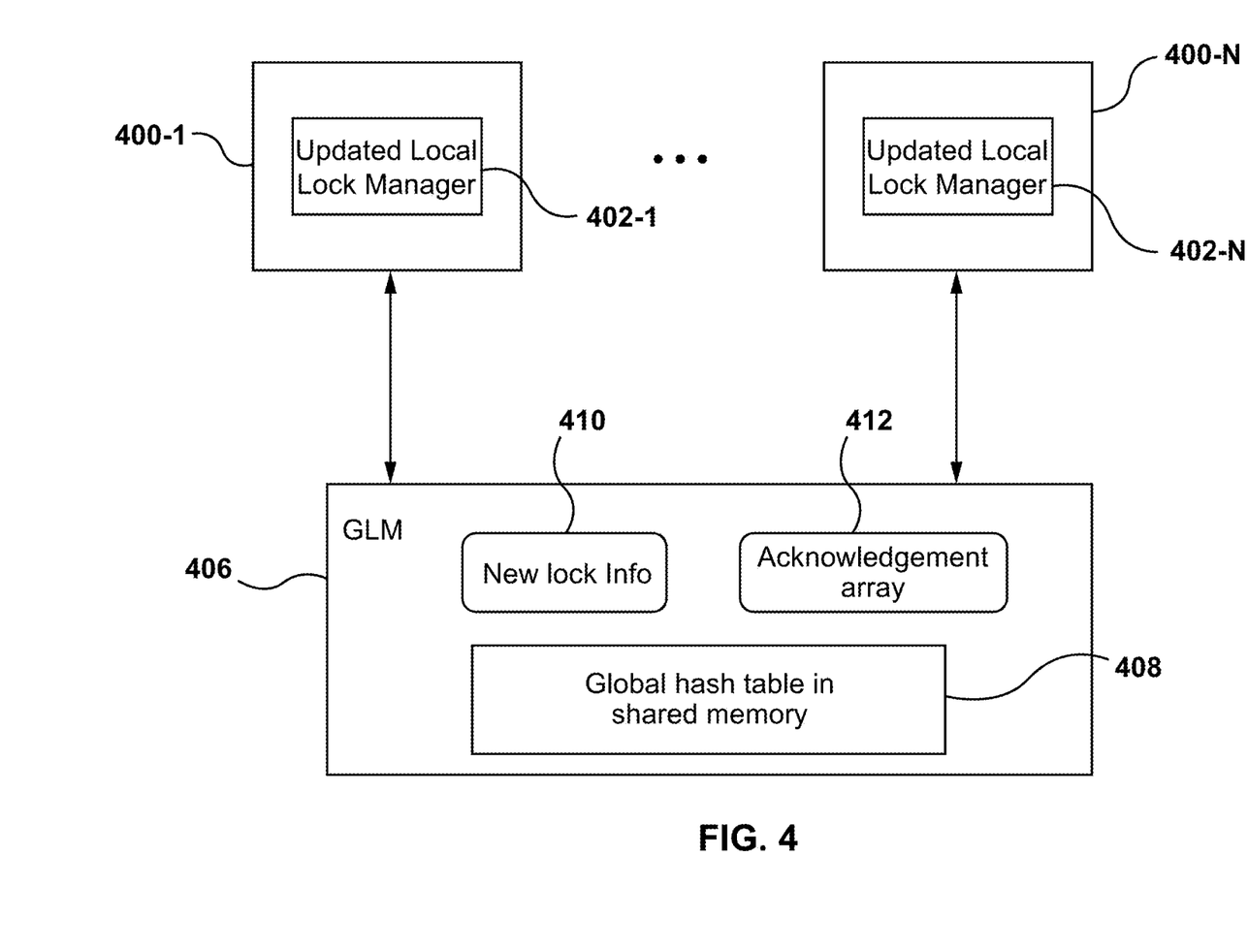
FIG. 4 depicts a system implementing a global lock manager (GLM) and updated local lock managers across N master nodes, in accordance with various embodiments of the present disclosure.

With this said, FIG. 4 illustrates a system implementing a global lock manager (GLM) 406 and updated local lock managers 402-1 . . . 402-N located in the N master nodes 400-1, 400-2 . . . 400-N, in accordance with various embodiments of the present disclosure. Each master node 400-1, 400-2 . . . 400-N includes similar components as the master node 100. As shown, the updated local lock managers 402-1 . . . 402-N may be implemented in the N master nodes 400-1, 400-2 . . . 400-N. The GLM 406 further employs a global hash table 408 in a shared memory, a new lock info module 410 and an acknowledgement array 412. The GLM 406 and the associated components (e.g. 408, 410 and 412) may be implemented in one or more servers 204 located at a distant location from the N master nodes 400-1, 400-2 . . . 400-N. In an alternative embodiments, the GLM 406 and the associated components may also be implemented in the N master nodes 400-1, 400-2 . . . 400-N. It will be understood that other elements may be present, but are not illustrated for the purpose of tractability and simplicity.

It will be appreciated that the updated local lock managers 402-1 . . . 402-N, the GLM 406 and the associated components (e.g. 408, 410 and 412) may be implemented as software that includes programming instructions which are stored in memories of the server(s) 204 and executable by processor(s) of the server(s) 204.

Figure 5:
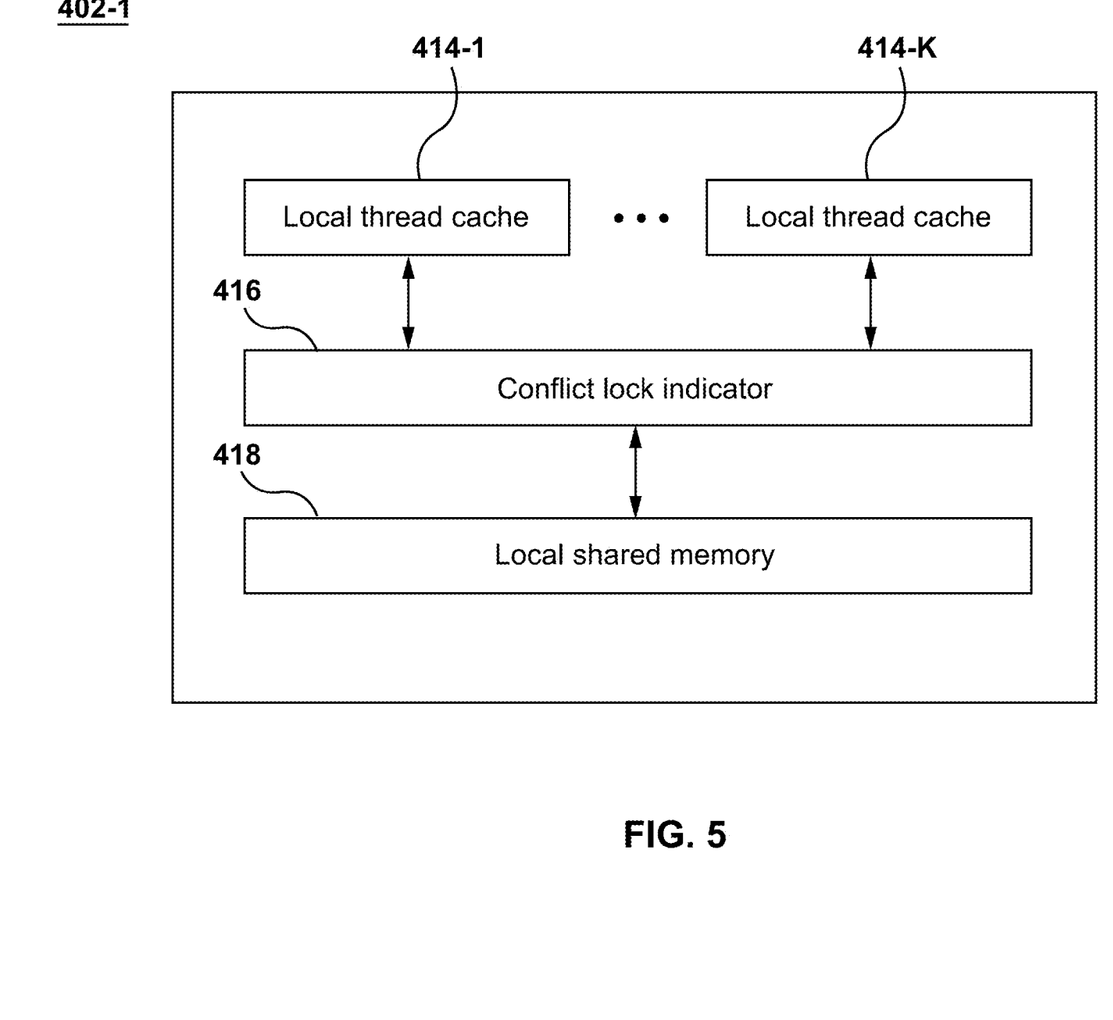
FIG. 5 depicts a detailed high level block diagram of an updated local lock manager, in accordance with various embodiments of the present disclosure.

In accordance with the above observations about classification of locks as self-compatible locks and heavy-conflicting locks, FIG. 5 depicts a detailed high level block diagram of an updated local lock manager 402-1, in accordance with various embodiments of the present disclosure. It is to be understood that all of the updated local lock managers 402-1 . . . 402-N may be implemented in a similar manner. As shown, the updated local lock manager 402-1 employs N local thread cache modules 414-1 . . . 414-K for K possible threads, a conflict lock indicator 416 and a local shared memory 418. One master node 400-1, 400-2 . . . 400-N may have a plurality of threads running in the thread cache modules 414-1-414-K. In other words, each master node 400-1, 400-2 . . . 400-N manages the locks requested by multiple threads locally. At a micro-level, the thread cache modules 414-1 . . . 414-K are requesting the locks.

Returning to FIG. 4, the N master nodes 400-1 . . . 400-N configured with the updated local lock managers 402-1 . . . 402-N may run various threads. Some of the threads may require locking on a shared data object (e.g. page, table or a row) in the database 208. To this end, the updated local lock managers 402-1 . . . 402-N may identify the category of each lock requested by the various threads or processes running on the master nodes 400-1 . . . 400-N as a self-compatible lock or a heavy-conflicting lock.

In the case the N master nodes 400-1 . . . 400-N are requesting for self-compatible locks, the updated local lock managers 402-1 . . . 402-N associated with the N master nodes 400-1 . . . 400-N may look at their respective conflict lock indicators (e.g. conflict lock indicator 416), to determine values of their respective counters. In case the counters are set to zero, the updated local lock managers 402-1 . . . 402-N may grant the lock requests by default without communicating with the GLM 406.

Every time there is a heavy-conflicting lock request, the updated local lock manager (e.g. the updated local lock manager 402-1) processing the thread requesting heavy-conflicting lock may notify the GLM 406. After receiving a heavy-conflicting lock request, the GLM 406 then notifies all the updated local lock managers 402-1 . . . 402-N to update their conflict lock indicators (e.g. conflict lock indicator 416), In so doing the conflict lock indicators (e.g. conflict lock indicator 416) increment an associated counter by one for each heavy-conflicting request. Once the counter in the conflict lock indicators (e.g. conflict lock indicator 416) becomes non-zero, all new self-compatible lock requests may not be granted by default, rather they may have to request lock remotely from the GLM 406.

In certain embodiments, the GLM 406 may broadcast such conflict lock indicators (e.g. conflict lock indicator 416) change information to each of the updated local lock managers 402-1 . . . 402-N and wait for all of them to reply. However, this process may involve transmitting N messages for every heavy lock request, where N is the number of master nodes 400-1 . . . 400-N.

In other embodiments of the present disclosure, the GLM 406 may group heavy-conflicting lock requests and broadcast such information to the conflict lock indicators (e.g. conflict lock indicator 416) in an asynchronous manner. It is to be understood that, certain DBMS may have a "bus" mechanism that periodically send metadata updates to each one of the master nodes 400-1 . . . 400-N. The bus mechanism may update busses every 20 milliseconds or so (such interval is called an "epoch" in literature), and the bus may increment its "epoch number" at every update.

To this end, the GLM 406 may place all of the heavy-conflicting lock request information (e.g. lock mode, ID master node requesting heavy-conflicting lock etc.) in the form of <epoch_number, lock-resource, lock-mode, acquire_or_release> into the new lock info module 410. As such, the GLM 406 groups all the heavy-conflicting lock requests within one interval (corresponding to one epoch-number) and broadcast this lock information to each one of the master nodes 400-1 . . . 400-N.

In certain embodiments, instead of broadcasting lock information to all master nodes 400-1 . . . 400-N, each of the master nodes 400-1 . . . 400-N may pull such lock information from the new lock info module 410 in the GLM 406. In so doing, the GLM 406 may not unnecessarily keep probing responses from slow master nodes. In certain cases, few master nodes could go online and offline from time to time, resulting in slow synchronization. Further, the GLM 406 may also prepare an acknowledgement array 412, with each slot in the acknowledgement array 412 corresponding to one master node (e.g. master node 400-1). It will be appreciated that, in certain embodiments, new lock info module 410 and acknowledgement array 412 may be implemented as a data structure in the GLM 406.

Once the master nodes 400-1 . . . 400-N pull the lock information from the new lock info module 410, each of the associated updated local lock managers 402-1 . . . 402-N may increment their respective conflict lock indicators (e.g. conflict lock indicator 416). Further each of the updated local lock managers 402-1 . . . 402-N disallow any new coming self-compatible locks to be granted by default, and all the new self-compatible lock requests may be sent to the GLM 406. The updated local lock managers 402-1 . . . 402-N then may copy all of their already-held self-compatible locks to their associated local shared memories (e.g. local shared memory 418) as well as register already-held self-compatible locks to the global hash table 408 in the shared memory of the GLM 406. As such, any heavy-conflicting lock request may be queued outside the global hash table 408 after all these self-compatible locks. A queued heavy-conflicting lock request may be granted after all the self-compatible locks have been released.

In certain embodiments, if a self-compatible lock request occurs after a heavy-conflicting lock request and, at that time, the heavy-conflicting lock request is yet to be granted, the self-compatible lock request may be queued prior to the heavy-conflicting lock in the global hash table 408 in the shared memory of the GLM 406, thereby prioritizing the self-compatible lock requests in a first-come first served manner over the heavy-conflicting lock request.

When all of the self-compatible lock requests have been registered to the global hash table 408 in the shared memory of the GLM 406, the master nodes 400-1 . . . 400-N may acknowledge back the GLM 406, confirming their operating conditions to be suitable for granting the heavy-conflicting lock to the requesting master node (e.g. master node 400-1). Such acknowledgement could be done in a batch via a separate remote procedure (RPC) call to the GLM 406 every epoch.

To this end, the updated local lock managers 402-1 . . . 402-N may update the corresponding epoch-numbers in various slots of the acknowledgement array 412. Once all the slots in the acknowledgement array 412 has been updated with an epoch number that is greater than or equal to the epoch number associated with the heavy-conflicting lock request in a new lock info module 410, this confirms that every master node has acknowledged about processing heavy-conflicting lock request. In this event, the GLM 406 may proceed to place this heavy-conflicting lock request either to a waiting list of the corresponding lock resource (if there are already existing self-compatible lock holders) in the global hash table 408 in a shared memory or to grant this heavy-conflicting lock to the requesting master node (e.g. master node 400-1).

It is to be appreciated that release of heavy-conflicting lock may also be processed in the batch mode as discussed above. When the GLM 460 receives heavy-conflicting lock release requests, the GLM 460 may place this heavy-conflicting lock release information (e.g. lock mode, ID master node releasing heavy-conflicting lock etc.) into new lock info module 410 in the form of <epoch_number, heavy-conflicting lock, release>. Once all the master nodes 400-1 . . . 400-N pull such heavy-conflicting lock release information, the corresponding updated local lock managers 402-1 . . . 402-N may decrement their conflict lock indicators (conflict lock indicator 416). Meanwhile, at the same time the GLM 406 may also notify the waiting list in the global hash table 408 in a shared memory and remove the heavy-conflicting lock. Unlike heavy-conflicting lock requests, the GLM 406 may not wait for acknowledgement for heavy-conflicting lock release requests from all the master nodes 400-1 . . . 400-N.

Figure 6:
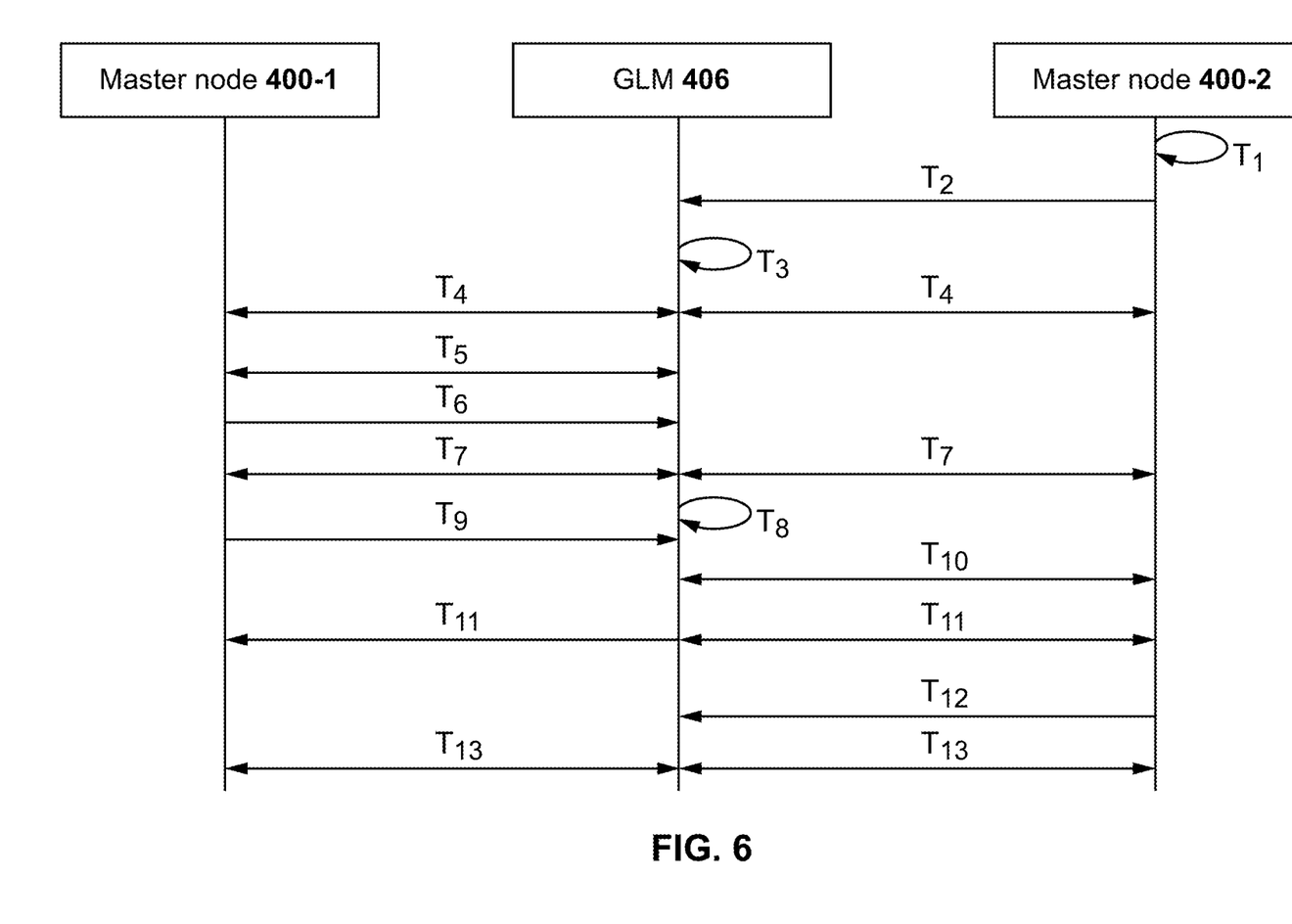
FIG. 6 depicts a representative sequence diagram with two master nodes requesting lock requests to the GLM, in accordance with various embodiments of present disclosure.

FIG. 6 illustrates a representative sequence diagram with two master nodes 400-1, 400-2 requesting various lock requests to the GLM 406, in accordance with various embodiments of present disclosure. As shown, at $T_1$ the master node 400-2 requests a self-compatible lock. The updated local lock manager 402-2 associated with the master node 400-2 may check the count in the associated conflict lock indicator (not shown). In case, the count is equal to zero, the updated local lock manager 402-2 associated with the master node 400-2 may grant the self-compatible lock to the requesting thread (e.g. thread 424), associated with the master node 400-2.

At $T_2$, the master node 400-2 requests a heavy-conflicting lock request. Such request may be directed to the GLM 406. At $T_3$, the GLM 406 may place the heavy-conflicting lock request information in the form of <epoch_3, heavy-conflicting lock identity, lock acquisition information> into the new lock info module 410.

At $T_4$, both of the master nodes 400-1 and 400-2 pull the heavy-conflicting lock request information from the new lock info module 410. Further, both of the master nodes 400-1 and 400-2 may increment the counters in their respective conflict lock indicators (e.g. conflict lock indicator 416) from 0 to 1. The master node 400-1 may acknowledge to GLM 460 by updating the epoch-number to epoch_4 in the corresponding slot of the acknowledgement array 412. However, the master node 400-2 may first register its already held self-compatible locks to the global hash table 408 in the shared memory of the GLM 406, and then acknowledge to the GLM 406 by updating the epoch-number to epoch_4 in the corresponding slot of the acknowledgement array 412.

Even though the master node 400-1 and 400-2 have updated their slots in the acknowledgement array 412, it will be appreciated that the GLM 406 has not processed such update yet and there are no heavy-conflicting lock holders inside the GLM 406 yet. Now at $T_5$, the master node 400-1 request self-compatible lock, and this time the self-compatible lock request may be directed to the GLM 406, as the counter associated with the conflict lock indicator 416 is incremented to 1. The self-compatible lock request is registered to the global hash table 408 in the shared memory of the GLM 406. Since there is no heavy lock holder on yet, the master node 400-1 gets the self-compatible lock immediately. At this point, the global hash table 408 in the shared memory of the GLM 406 has two holders of self-compatible lock, one from the master node 400-1 and the other from master node 400-2.

At $T_6$, the master node 400-1 request for a heavy-conflicting lock request. Such request may be directed to the GLM 406. At $T_7$, the GLM 406 may place the heavy-conflicting lock request information in the form of <epoch_7, heavy-conflicting lock, lock acquisition information> into the new lock info module 410. Further, both of the master nodes 400-1 and 400-2 may increment the counters in their respective conflict lock indicators (e.g. conflict lock indicator 416) from 1 to 2. The master nodes 400-1 and 400-2 may also acknowledge to GLM 460 by updating the epoch-number to epoch_7 in the corresponding slot of the acknowledgement array 412.

Since the global hash table 408 in the shared memory of the GLM 406 already has two self-compatible lock holders, one from the master node 400-2 at $T_4$, and one from the master node 400-1 at $T_5$, hence at $T_8$ the GLM 406 place the heavy-conflicting lock request by the master node 400-1 after the heavy-conflicting lock request by the master node 400-2 in a waiting list in the global hash table 408 in the shared memory of the GLM 406 after the two self-compatible lock holders.

At $T_9$ the master node 400-1 releases the already held self-compatible lock and sends this self-compatible lock release request to the GLM 406. At $T_{10}$ the master node 400-2 releases the already held self-compatible lock and sends this self-compatible lock release request to the GLM 406. As there are no more self-compatible lock holders, hence the GLM 406 may now process heavy-conflicting lock request by the master node 400-2 and grants the heavy-conflicting lock as requested by the master node 400-2.

At $T_{11}$ the master node 400-2 releases the heavy-conflicting lock and sends this heavy-conflicting lock release request to the GLM 406. To this end, the GLM 406 may place the heavy-conflicting lock release request information in the form of <epoch_11, heavy-conflicting lock, release> into the new lock info module 410. Further, both of the master nodes 400-1 and 400-2 may decrement the counters in their respective conflict lock indicators (e.g. conflict lock indicator 416) from 2 to 1. The GLM 406 may now process heavy-conflicting lock request by the master node 400-1 and grants the heavy-conflicting lock as requested by the master node 400-1.

At $T_{12}$, the master node 400-2 request self-compatible lock, and this time also the self-compatible lock request may be directed to the GLM 406, as the counter is still greater than 0 and is registered to the global hash table 408 in the shared memory of the GLM 406. Since the global hash table 408 in the shared memory of the GLM 406 already has a heavy-conflicting lock holder from master node 400-1, hence at $T_{12}$ the GLM 406 may place the self-compatible lock request from the master node 400-2 in the waiting list in the global hash table 408 in the shared memory of the GLM 406 to be processed after the release of heavy-conflicting lock.

At $T_{13}$ the master node 400-1 releases the heavy-conflicting lock and sends this heavy-conflicting lock release request to the GLM 406. The GLM 406 may grant the self-compatible lock requested by the master node 400-2. At the same time, the GLM 406 may also notify the master nodes 400-1 and 400-2 via the new lock info module 410 to decrement the counters in their respective conflict lock indicators (e.g. conflict lock indicator 416) from 1 to 0, in a similar manner as discussed above. Once the counters in respective conflict lock indicators (e.g. conflict lock indicator 416) become equal to 0, all self-compatible lock requests may be granted locally inside the master nodes 400-1 and 400-2. It is to be noted that, in a situation if one of the master nodes 400-1 and 400-2 has lost a communication with the GLM 406, the GLM 406 may try to communicate again with the respective master node.

It will be appreciated that conflict lock indicators in the updated local lock managers 402-1 . . . 402-N may assist the system 200 to reduce the self-compatible lock requests to request lock from the GLM 406, when there are no heavy-conflicting locks and/or heavy-conflicting lock requests elsewhere. Returning to FIG. 4, the local shared memories (e.g. local shared memory 418) in the updated local lock managers 402-1 . . . 402-N assist each of the master node 400-1 . . . 400-N to avoid repeatedly requesting the same lock to the GLM 406.

It is to be noted that, in the event of a master node (e.g. master node 400-1) requesting a self-compatible lock or a heavy-conflicting lock to the GLM 406 for the first time, the request may be granted immediately, or may get blocked inside the GLM 406 until all conflicting locks are released.

If the lock is granted immediately by the GLM 406, the requesting master node (e.g. master node 400-1) may hold the lock in its local shared memory (e.g. local shared memory 418). Next time if a different thread in the same master node (e.g. master node 400-1) is requesting the same lock, the new request just waits for the current lock holder to release the lock (if the lock is a heavy-conflicting lock), or the new request gets the lock (if the lock is self-compatible lock) from the current lock holder in the same master node (e.g. master node 400-1) Either way, all subsequent lock requesters within the same master node (e.g. master node 400-1) do not need to request lock from the GLM 406.

However, in case if the master node (e.g. master node 400-1) requesting a self-compatible lock or a heavy-conflicting lock to the GLM 406 for the first time gets blocked inside the GLM 406, all subsequent lock requests from the same master node (e.g. master node 400-1) may wait in its local shared memory (e.g. local shared memory 418) for the first lock requester to return with a lock grant. Once the lock request is granted, all subsequent lock requests from the same master node (e.g. master node 400-1) may be processed as discussed above. That is, all subsequent lock requesters from the same master node (e.g. master node 400-1) do not need to request lock from the GLM 406.

In certain embodiments, the local shared memory (e.g. local shared memory 418) associated with a master node (e.g. master node 400-1) may keep a count for each lock. As such, for every lock granted locally in this master node, the local shared memory (e.g. local shared memory 418) increments an associated counter (not shown) for that lock. At the time of lock release, the master node (e.g. master node 400-1) may decrement the associated counter (not shown). Only when the associated counter (not shown) decrements to 0 then that lock release request should be sent to the GLM 406. However, in certain embodiments, to avoid other master nodes from starving the lock request, a limit on the maximum number of lock requests waiting on the local shared memory (e.g. local shared memory 418) of a master node (e.g. master node 400-1) could be set, provided the counter in the conflict lock indicator (e.g. conflict lock indicator 416) is greater than zero.

Figure 7:
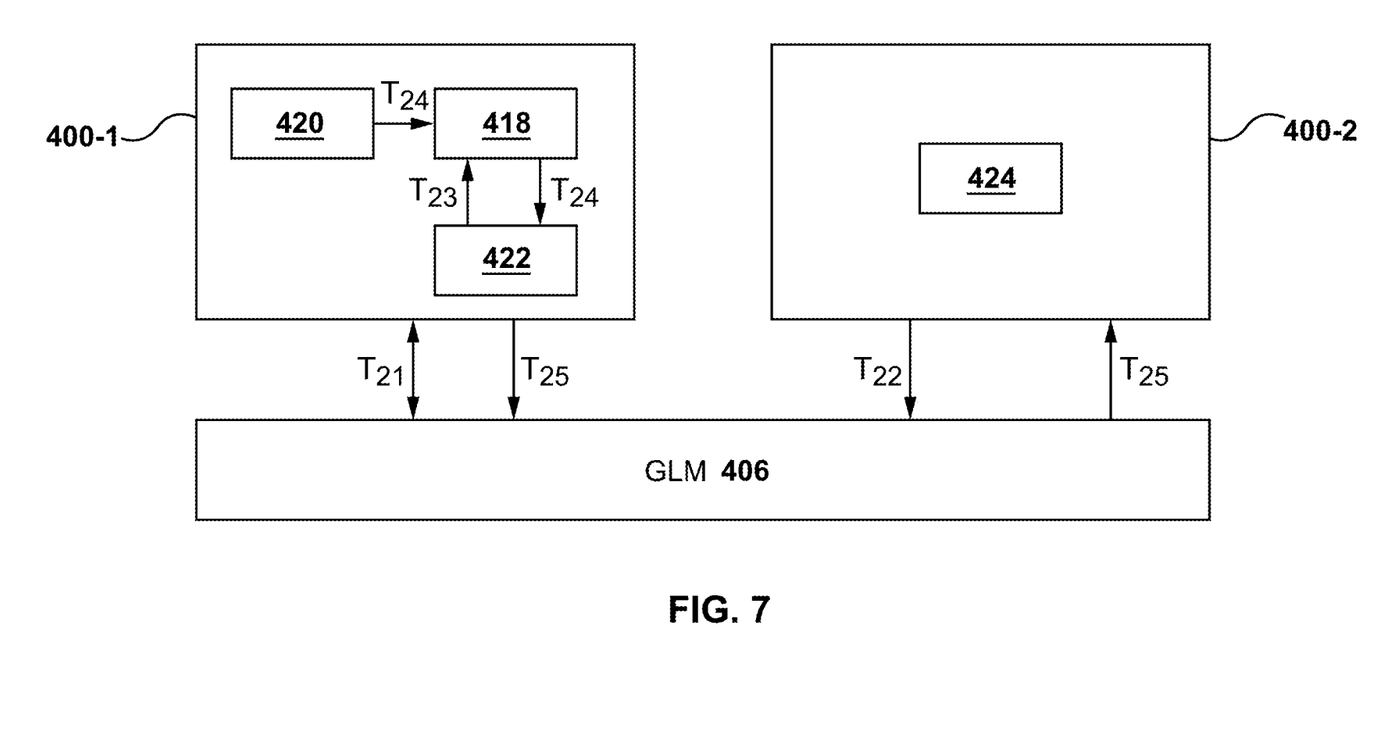
FIG. 7 depicts a block diagram with two master nodes requesting various lock requests to the GLM, in accordance with various embodiments of the present disclosure.

FIG. 7 illustrates a high-level representative block diagram with two master nodes 400-1, 400-2 requesting lock requests to the GLM 406 for the first time, in accordance with various embodiments of present disclosure. Arrows shown on the block diagram of FIG. 7 illustrate a signaling sequence between the two master nodes 400-1, 400-2 and the GLM 406. In the following example both the master nodes 400-1 and 400-2 are requesting locks for the first time from the GLM 406.

As shown, at $T_{21}$, a thread 420 associated with the master node 400-1 requests a lock from GLM 406. The request is granted, being the first lock request. In certain embodiments, the thread 420 may inform the local lock memory 418 about the granted lock.

At $T_{22}$, a thread 424 associated with the master node 400-2 requests a lock from GLM 406. In this example, the lock requested by thread 424 associated with master node 400-2 is not compatible with the lock granted to the thread 420 associated with master node 400-1. Consequently, the lock requested by the thread 424 may get blocked inside the GLM 406 until the conflicting lock acquired by the thread 420 is released and the same has been acknowledged to the GLM 406.

At $T_{23}$, another thread 422 associated with the master node 400-1 requests the same lock and the lock request is stored in the local shared memory 418. This lock is already allocated to the thread 420 in the master node 400-1, so instead of sending this request from the thread 422 to GLM 406, the thread 422 waits for the thread 420 to release the lock, in case this lock is conflicting.

At $T_{24}$, the thread 420 releases the lock and informs the local shared memory 418 and, because the thread 422 is already waiting for the lock locally, the thread 422 gets the lock granted. As such, this lock transfer between threads 420 and 422 may not be informed to GLM 406. At $T_{25}$, the master node 400-1 releases the lock and sends the lock release request to the GLM 406. Now, the GLM 406 processes the lock request by the master node 400-2 and grants the lock to the thread 424.

Returning to the FIG. 4, it will be appreciated that the conflict lock indicators associated with each one of the master nodes 400-1 . . . 400-N may potentially save self-compatible lock requests to request lock from the GLM 406, resulting in an efficient utilization of network overhead and latency associated with the system 200.

Further, the bus mechanism (not shown) associated with system 200 may allow various heavy-conflicting lock requests to be processed in a batch mode. In certain embodiments, during this batch processing, self-compatible locks may still get granted locally (before the conflict lock indicators update their respective counters) or get granted from GLM 406 without waiting. As it may take more than one epoch before all master nodes 400-1 . . . 400-N increment the counters in their conflict lock indicators (e.g. conflict lock indicator 416). However, during that period, all self-compatible locks still get granted without waiting for the heavy-conflicting lock to be processed.

Also, once the heavy-conflicting lock gets released, all the self-compatible locks waiting in the global hash table 408 in a shared memory may be granted immediately inside GLM 406, and after one or more epoch when all of the master nodes 400-1 . . . 400-N have cleared their counters in the conflict lock indicators (e.g. conflict lock indicator 416), all self-compatible locks may get granted locally within their master nodes 400-1 . . . 400-N. Therefore, this setup may allow as much concurrency among self-compatible locks requesters as possible.

Moreover, the local shared memories (e.g. local shared memory 418) in each one of the updated local lock managers 402-1 . . . 402-N may allow each of the master nodes 400-1 . . . 400-N to process lock acquire/releases locally without forwarding such requests to the GLM 406. No master node may submit the same lock request more than once to the GLM 406. However, a second acquire request may only be forwarded to the GLM 406 after the first lock gets released. All concurrent requests/release can be consumed locally inside the master nodes 400-1 . . . 400-N.

Figure 8:
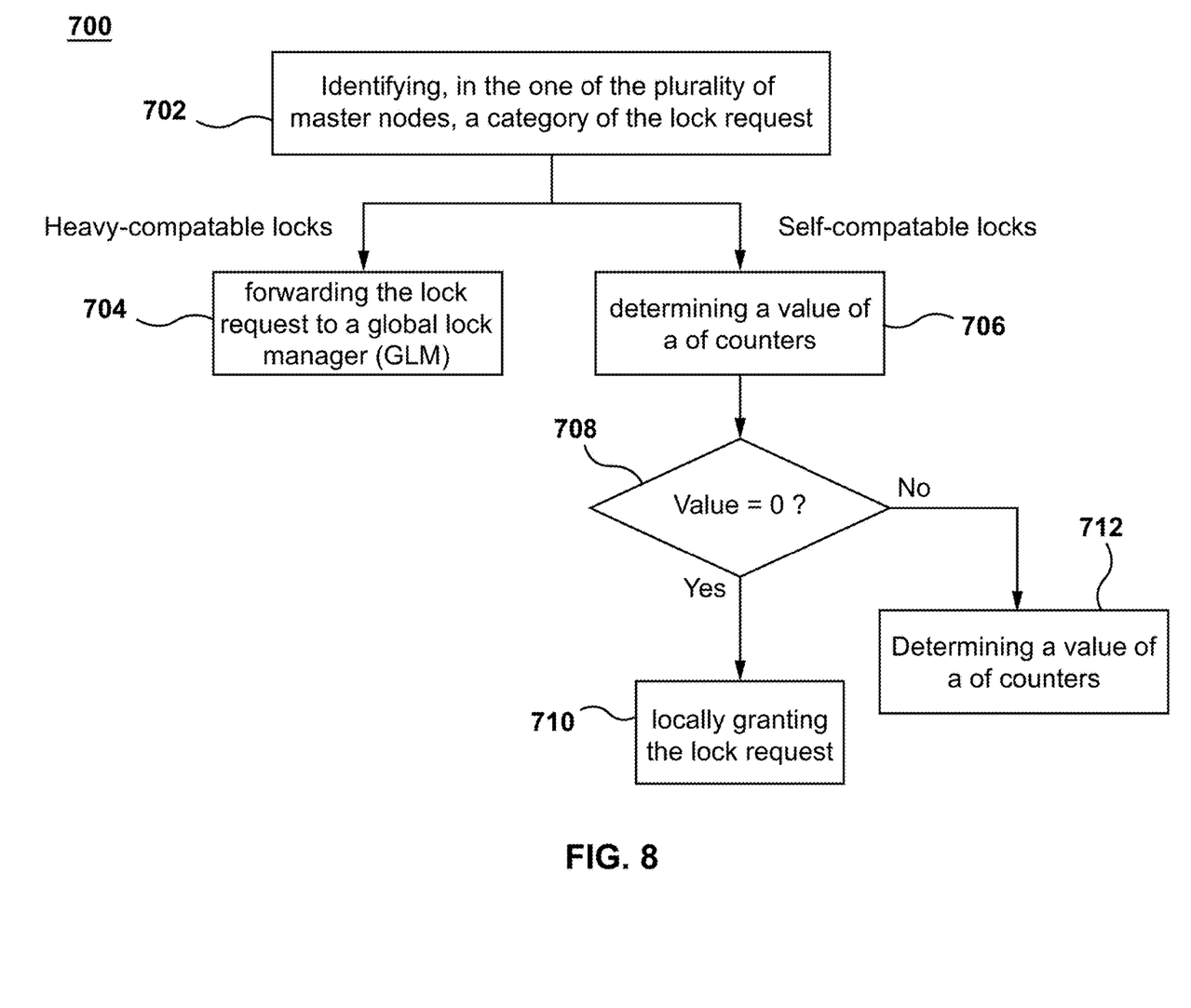
FIG. 8 depicts a flow diagram of a process directed to a method implemented in the system, in accordance with various embodiments of the present disclosure.
Figure 9:
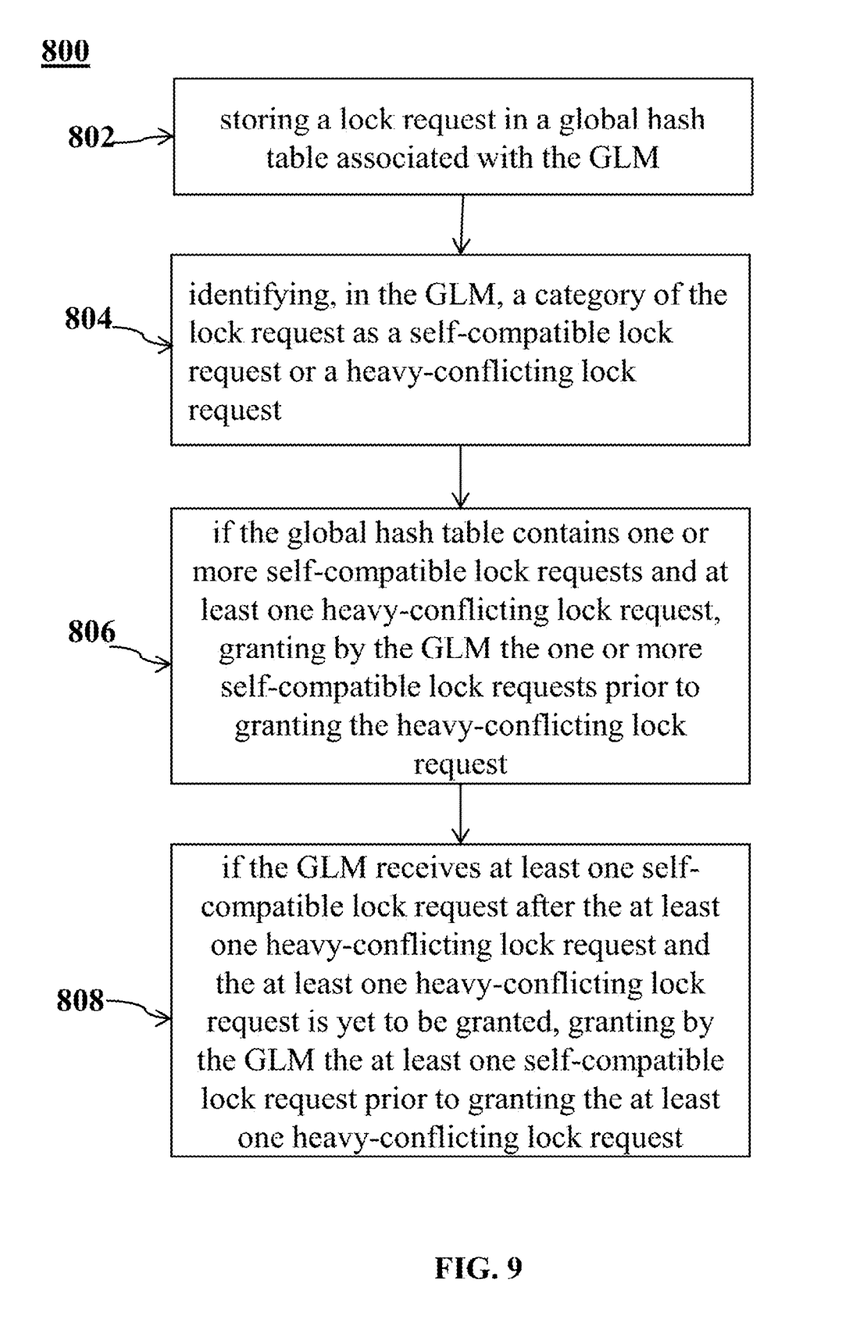

FIG. 8 depicts a functional flow diagram of process 700 directed to a method implemented in the system 200, in accordance with various embodiments of the present disclosure. In the system 200, the master node 400-1 is one of the plurality of master nodes 400-1 . . . 400-N and is thus part of the system 200 that includes the master node 400-1 and one or more other master nodes 400-2 . . . 400-N.

Process 700 commences at task block 702, where the master node 400-1 identifies a category of the lock request. As noted above, in the master node 400-1, the updated local lock manager 402-1 may identify the category of the locks requested by various threads or processes being implemented by the master node 400-1, such as a self-compatible lock or a heavy-conflicting lock.

In case the identified lock is for a heavy-compatible lock, process 700 proceeds at task block 704, where the master node 400-1 forwards the lock request by the one of the plurality of master nodes to a global lock manager (GLM). As discussed above, for heavy-conflicting lock request, the updated local lock manager (e.g. the updated local lock manager 402-1) processing the thread requesting heavy-conflicting lock notifies the GLM 406.

After receiving a heavy-conflicting lock request, the GLM 406 then notifies all the updated local lock manager 402-1 to update its conflict lock indicator 416. In so doing the conflict lock indicator 416 increments an associated counter by one for each heavy-conflicting request.

In case the identified lock is for a self-compatible lock, process 700 proceeds at task block 706, where the master node 400-1 determines a value of a counter associated with the master node 400-1 and with the one or more other master nodes 400-2 . . . 400-N. As previously discussed, in the event of self-compatible lock requests, the updated local lock manager 402-1 may look at its conflict lock indicator 416 to determine a values of the counter associated with the master node 400-1 and with the one or more other master nodes 400-2 . . . 400-N.

At task block 708, if the counter is set to zero, process 700 moves to task block 710. At task block 710, if the value of the counter is zero, the master node 400-1 locally grants the lock request. As noted above, in case the counter is set to zero, the updated local lock manager 402-1 may to grant the lock requests by default without communicating with the GLM 406.

At task block 708, if the counter is not equal to zero, process 700 moves to task block 712. At task block 712, if the value of the counter is greater than zero, the master node 400-1 forwards the lock request to the GLM. As discussed above, once the counter in the conflict lock indicator 416 becomes non-zero, all new self-compatible lock requests may not be granted by default, rather the master node 400-1 may request lock remotely from the GLM 406.

FIG. 8 depicts a functional flow diagram of process 800 directed to a method implemented in the system 200, in accordance with various embodiments of the present disclosure.

Process 700 commences at task block 802, where the GLM 406 stores a lock request received by one the plurality of master nodes 400-1 . . . 400-N in a global hash table associated with the GLM 406.

At task block 802, the GLM 406 identifies a category of the lock request as a self-compatible lock request or a heavy-conflicting lock request and the process 800 advances to task block 806.

At task block 806, if the global hash table contains one or more self-compatible lock requests and at least one heavy-conflicting lock request, the GLM 406 grants the one or more self-compatible lock requests prior to granting the heavy-conflicting lock request and the process 800 advances to task block 808.

Finally, at task block 808, if the GLM 406 receives at least one self-compatible lock request after the at least one heavy-conflicting lock request and the at least one heavy-conflicting lock request is yet to be granted, the GLM 406 grants the at least one self-compatible lock request prior to granting the at least one heavy-conflicting lock request.

It will be appreciated that the process 700 may also be performed by computer programs, which may exist in a variety of forms both active and inactive. Such as the computer programs may exist as a software program(s) comprised of program instructions in source code, object code, executable code or other formats. Any of the above may be embodied in a computer-readable medium, which include storage devices and signals, in compressed or uncompressed form. Representative non-transitory computer-readable storage devices include conventional computer system RAM (random access memory), ROM (read only memory), EPROM (erasable, programmable ROM), EEPROM (electrically erasable, programmable ROM), and magnetic or optical disks or tapes. Representative computer-readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer-readable medium. The same is true of computer networks in general.

It is to be understood that the operations and functionality of the described system 200, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for processing a lock request by a master node to access a shared resource located at a remote location, the method comprising:
   identifying, by the master node, a category of the lock request;
   responsive to identifying that the category of the lock request is for a self-compatible lock request:
       determining a value of a counter associated with the master node and with one or more other master nodes, and:
           when the value of the counter is zero, locally granting the lock request;
           when the value of the counter is greater than zero, forwarding the lock request to a global lock manager (GLM);
   responsive to identifying that the category of the lock request is for a heavy-conflicting lock request, forwarding the lock request by the master node to the GLM; and
   retrieving, by the master node, information associated with a release of an active heavy-conflicting lock from the GLM and decrementing the counter associated with the master node and with the one or more other of master nodes.

2. The method of claim 1, wherein locally granting the lock request by the master node is performed without communicating with the GLM.

3. The method of claim 1, further comprising:
   retrieving, by the master node, information associated with the lock request from the GLM; and
   incrementing, by the master node, the counter associated with the master node and with the one or more other master nodes.

4. The method of claim 3, wherein the information associated with the lock request comprises an epoch number, a heavy-conflicting lock identity, and lock acquisition information.

5. The method of claim 4, wherein the master node acknowledges the GLM by updating the epoch number in an acknowledgement array.

6. The method of claim 1, further comprising holding a lock by the master node, the master node continuing to hold the lock for at least one subsequent lock request for the same lock within the master node.

7. The method of claim 6, wherein the lock is a subsequent self-compatible lock or a subsequent heavy-conflicting lock.

8. The method of claim 6, further comprising granting the at least one subsequent lock request locally without communicating with the GLM.

9. The method of claim 6, further comprising storing the at least one subsequent lock request within a local shared memory of the master node.

10. The method of claim 9, wherein the local shared memory of the master node further comprises an associated counter counting the number of subsequent lock requests being stored and granted locally within the local shared memory of the master node.

11. The method of claim 10, further comprising applying a limit on a maximum number of subsequent lock requests being stored and granted locally within the local shared memory of the master node.

12. A master node for processing a lock request for accessing a resource located at a remote location and shared by the master node and by one of more other master nodes, the master node comprising:
   a processor;
   a non-transitory computer-readable medium comprising instructions that, when executed, cause the processor to:
   identify, by the master node, a category of the lock request;
   responsive to identifying that the category of the lock request is for a self-compatible lock request:
       determine a value of a counter associated with the master node and with the one of more other master nodes, and:

when the value of the counter is zero, locally grant the lock request;

when the value of the counter is greater than zero, forward the lock request by the master node to a global lock manager (GLM);

responsive to identifying that the category of the lock request is for a heavy-conflicting lock request, forwarding the lock request by the master node to the GLM; and retrieving, by the master node, information associated with a release of an active heavy-conflicting lock from the GLM and decrementing the counter associated with the master node and with the one or more other of master nodes.

13. A method for processing a lock request by a global lock manager (GLM), wherein the lock request is requested by a plurality of master nodes to access a shared resource, the method comprising:

storing a lock request in a global hash table associated with the GLM;

identifying, in the global hash table associated with the GLM, a category of the lock request as a self-compatible lock request or a heavy-conflicting lock request;

when the global hash table contains one or more self-compatible lock requests and at least one heavy-conflicting lock request, granting by the GLM the one or more self-compatible lock requests prior to granting the at least one heavy-conflicting lock request; and when the GLM receives another self-compatible lock request and the at least one heavy-conflicting lock request is yet to be granted, granting by the GLM the another self-compatible lock request prior to granting the at least one heavy-conflicting lock request.

14. The method of claim 13, further comprising:

placing a new self-compatible lock request on hold in the global hash table by the GLM, if there is an active heavy-conflicting lock in one of the plurality of the master nodes; and releasing the new self-compatible lock request following a release of the active heavy-conflicting lock by one of the plurality of the master nodes.

15. The method of claim 14, further comprising granting, by the GLM, a plurality of new self-compatible lock requests held in the global hash table following the release of the active heavy-conflicting lock by one of the plurality of the master nodes.

16. The method of claim 15, wherein:

the GLM places information associated with the release of the active heavy-conflicting lock on a data structure to be pulled by the plurality of master nodes.

17. A global lock manager (GLM) for processing a lock request requested by a plurality of master nodes for accessing a resource, the GLM comprising:

one or more servers, the one or more servers comprising one or more processors; and a non-transitory computer-readable medium comprising instructions that, when executed, cause the one or more processors to:

store a lock request in a global hash table associated with the GLM;

identify, in the global hash table associated with the GLM, a category of the lock request as a self-compatible lock request or a heavy-conflicting lock request;

when the global hash table contains one or more self-compatible lock requests and at least one heavy-conflicting lock request, grant by the GLM the one or more self-compatible lock requests prior to granting the at least one heavy-conflicting lock request; and when the GLM receives another self-compatible lock request and the at least one heavy-conflicting lock request is yet to be granted, grant by the GLM the another self-compatible lock request prior to granting the at least one heavy-conflicting lock request.

18. The GLM of claim 17, wherein the instructions further cause the one or more processors to:

place a new self-compatible lock request on hold in the global hash table, if there is an active heavy-conflicting lock in one of the plurality of the master nodes; and release the new self-compatible lock request following a release of the active heavy-conflicting lock by one of the plurality of the master nodes.

19. The GLM of claim 17, wherein the instructions further cause the one or more processors to grant a plurality of new self-compatible lock requests held in the global hash table following the release of the active heavy-conflicting lock by one of the plurality of the master nodes.

* * * * *